(12) United States Patent
Yamada

(10) Patent No.: US 10,924,588 B2
(45) Date of Patent: Feb. 16, 2021

(54) PUBLIC NETWORK CONNECTION CONTROL METHOD AND APPLICATION MANAGEMENT DEVICE

(71) Applicant: GURUNAVI, INC., Tokyo (JP)

(72) Inventor: Atsushi Yamada, Tokyo (JP)

(73) Assignee: GURUNAVI. INC., Chiyoda-ku (JP)

( * ) Notice: Subject to any disclaimer, the term of this patent is extended or adjusted under 35 U.S.C. 154(b) by 0 days.

(21) Appl. No.: 16/091,381

(22) PCT Filed: May 10, 2017

(86) PCT No.: PCT/IB2017/000626
§ 371 (c)(1),
(2) Date: Oct. 4, 2018

(87) PCT Pub. No.: WO2017/195033
PCT Pub. Date: Nov. 16, 2017

(65) Prior Publication Data
US 2019/0141165 A1    May 9, 2019

(30) Foreign Application Priority Data

May 10, 2016  (JP) ................................. 2016-094507
Jan. 16, 2017  (JP) ................................. 2017-012422

(51) Int. Cl.
H04L 29/08       (2006.01)
H04M 1/725      (2006.01)
(Continued)

(52) U.S. Cl.
CPC ................ H04L 67/34 (2013.01); G06F 8/61 (2013.01); H04L 67/141 (2013.01);
(Continued)

(58) Field of Classification Search
CPC .... H04L 67/34; H04L 67/141; H04M 1/7525; H04W 76/38; H04W 76/11; H04W 4/50; H04W 8/245; H04W 84/12; G06F 8/61
See application file for complete search history.

(56) References Cited

U.S. PATENT DOCUMENTS 7,239,877 B2 * 7/2007 Corneille .................. G06F 8/61
                                                                        455/411
2009/0093232 A1   4/2009 Gupta et al.
(Continued)

FOREIGN PATENT DOCUMENTS

EP      2 793 447 A1   10/2014
JP      2013-25754 A    2/2013
(Continued)

OTHER PUBLICATIONS

International Search Report for PCT/IB2017/000626 dated Sep. 5, 2017 (PCT/ISA/210).
(Continued)

Primary Examiner — Azizul Choudhury
(74) Attorney, Agent, or Firm — Sughrue Mion, PLLC

(57) ABSTRACT

Provided is a public network connection control method including the steps of: receiving a connection request to a public network (5) from a mobile terminal (1); installing an application in the mobile terminal (1) or transmitting installation information if the connection request to the public network (5) is received; and transmitting the connection request to the public network (5) to a public wireless LAN connection control device (4) if the connection request to the public network (5) is received.

20 Claims, 8 Drawing Sheets

(51) Int. Cl.
*G06F 8/61* (2018.01)
*H04W 8/24* (2009.01)
*H04W 76/11* (2018.01)
*H04W 76/38* (2018.01)
*H04W 4/50* (2018.01)
*H04W 84/12* (2009.01)

(52) U.S. Cl.
CPC ......... *H04M 1/72525* (2013.01); *H04W 4/50* (2018.02); *H04W 8/245* (2013.01); *H04W 76/11* (2018.02); *H04W 76/38* (2018.02); *H04W 84/12* (2013.01)

(56) References Cited

U.S. PATENT DOCUMENTS

| | | | |
|---|---|---|---|
| 2011/0044245 A1* | 2/2011 | Hasegawa | H04W 88/08 370/328 |
| 2012/0041808 A1* | 2/2012 | Hofer | G06Q 30/02 705/14.17 |
| 2012/0329555 A1 | 12/2012 | Jabara et al. | |
| 2014/0324527 A1 | 10/2014 | Kulkarni et al. | |
| 2015/0365381 A1* | 12/2015 | Durbin | H04L 63/0272 726/15 |
| 2016/0087933 A1* | 3/2016 | Johnson | H04W 4/70 709/245 |
| 2016/0127898 A1* | 5/2016 | Gupta | G06F 21/43 726/7 |

FOREIGN PATENT DOCUMENTS

| | | |
|---|---|---|
| JP | 2014-14122 A | 1/2014 |
| JP | 2014-134833 A | 7/2014 |
| JP | 2015-11543 A | 1/2015 |
| JP | 2015-210784 A | 11/2015 |

OTHER PUBLICATIONS

Written Opinion of the International Search Authority for PCT/IB2017/000626 dated Sep. 5, 2017 (PCT/ISA/210).
Brief description of the related invention: JP Patent No. 6082830.
Office Action dated Jun. 23, 2020 in Japanese Application No. 2017-012422.

* cited by examiner

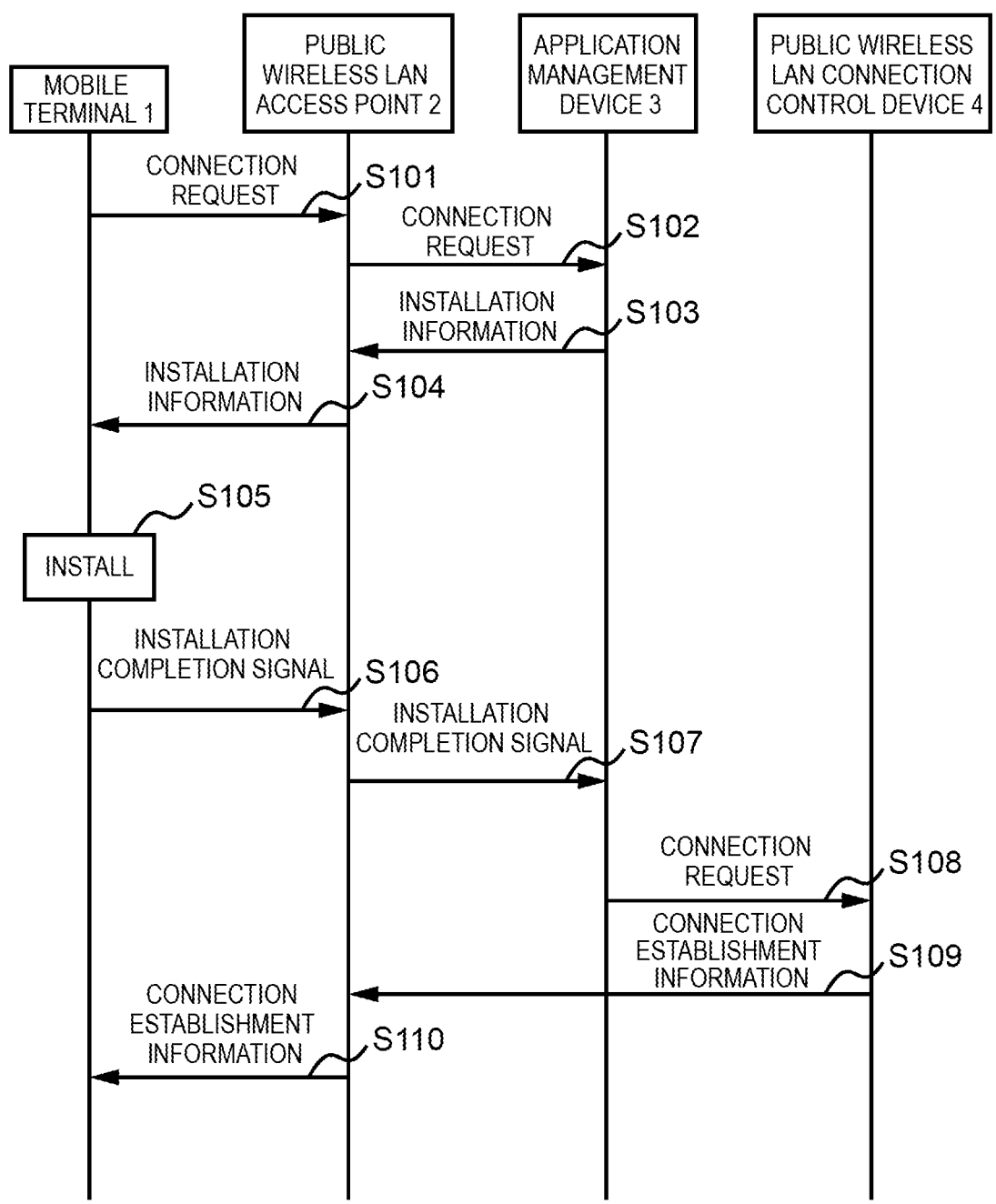

US 10,924,588 B2

PUBLIC NETWORK CONNECTION CONTROL METHOD AND APPLICATION MANAGEMENT DEVICE

CROSS REFERENCE TO RELATED APPLICATIONS

This application is a National Stage of International Application No. PCT/IB2017/000626 filed May 10, 2017, claiming priority based on Japanese Patent Application No. 2016-094507, filed May 10, 2016 and Japanese Patent Application No. 2017-012422 filed Jan. 16, 2017, the entire contents of each of which are herein incorporated by reference in their entireties.

BACKGROUND OF THE INVENTION

1. Field of the Invention

The present invention relates to a public network connection control method and an application management device.

2. Description of Related Art

Along with the popularization of mobile terminals, applications for mobile terminals have been actively developed and released and there has been a fierce competition for acquiring users for the applications. In general, applications have been popularized and users for the applications have been acquired using various marketing techniques, such as advertisements. However, since the types of the marketing techniques are limited, there is a demand for a technique that can contribute to the popularization of applications.

For example, a technique for inducing user's interest in an application that has never been used before by the user by temporarily providing the user with a reward for the application in order to enhance the user's motivation to use applications for mobile terminals is known (e.g., see Japanese Patent Application Publication No. 2015-11543).

However, the technique does not effectively function for a user who does not want to disclose his/her individual information as to applications used by the user. Further, it may be difficult for a user, such as a traveler from abroad, who carries a mobile terminal that is generally used by the user in other countries to recognize the use status of applications.

SUMMARY OF THE INVENTION

Accordingly, a main object of the present invention is to provide a public network connection control method and an application management device which are capable of improving the awareness of applications for mobile terminals and popularizing the applications.

A public line connection control method according to a first aspect of the present invention includes the steps of: receiving a connection request to a public network from a mobile terminal; installing an application in the mobile terminal, or transmitting installation information, if the connection request to the public network is received; and transmitting the connection request to the public network to a public wireless LAN connection control device if the connection request to the public network is received.

According to the first aspect of the present invention, if a signal indicating that the mobile terminal has installed the application is received, or if a signal indicating that the mobile terminal has received the installation information is received, the connection request to the public network may be transmitted to the public wireless LAN connection control device.

According to the first aspect of the present invention, the installation of the application or the transmission of the installation information to the mobile terminal may be performed via a public wireless LAN access point, and if a signal indicating that the public wireless LAN access point has installed the application or has transmitted the installation information to the mobile terminal is received, the connection request to the public network may be transmitted to the public wireless LAN connection control device.

According to the first aspect of the present invention, if a signal indicating that the mobile terminal has started to use the application is received, the connection request to the public network may be transmitted to the public wireless LAN connection control device.

According to the first aspect of the present invention, if a signal indicating that the mobile terminal has logged in to the application is received, the connection request to the public network may be transmitted to the public wireless LAN connection control device.

According to the first aspect of the present invention, if a signal indicating the mobile terminal has logged in to the application is not received, a connection upper limit time may be set to the public wireless LAN connection control device and then the connection request to the public network may be transmitted.

According to the first aspect of the present invention, a connection upper limit time may be set according to at least one of an operating time and a use content of the application in the mobile terminal and the connection request to the public network may be transmitted.

According to the first aspect of the present invention, the connection upper limit time may be set to be longer as the operating time of the application in the mobile terminal increases.

According to the first aspect of the present invention, the use content may include the number of reservations of a facility, or a frequency of reservations of the facility, the reservations of the facility being made using the application, and the connection upper limit time may be set to be longer as the number of reservations or the frequency of reservations increases.

According to the first aspect of the present invention, the use content may include at least one of a type of a reserved facility and a reserved use period of the reserved facility, the facility being reserved using the application in the mobile terminal, and the connection upper limit time may be set to be longer as the reserved use period or a use period estimated according to the type of the facility increases.

A public line connection control method according to a second aspect of the present invention includes the steps of: receiving a connection request to a public network from a mobile terminal; installing an application in the mobile terminal, or transmitting installation information, if the connection request to the public network is received; and establishing a connection to the public network.

According to the second aspect of the present invention, if a signal indicating that the mobile terminal has installed the application is received, or if a signal indicating that the mobile terminal has received the installation information is received, the connection to the public network may be established.

According to the second aspect of the present invention, the installation of the application or the transmission of the installation information to the mobile terminal may be performed via a public wireless LAN access point, and if a signal indicating that the public wireless LAN access point has performed the installation of the application or the transmission of the installation information to the mobile terminal is received, the connection to the public network may be established.

According to the second aspect of the present invention, if a signal indicating that the mobile terminal has started to use the application is received, the connection to the public network may be established.

According to the second aspect of the present invention, if a signal indicating that the mobile terminal has logged in to the application is received, the connection to the public network may be established.

According to the second aspect of the present invention, if a signal indicating that the mobile terminal has logged in to the application is not received, a connection upper limit time may be set and then the connection to the public network may be established.

According to the second aspect of the present invention, a connection upper limit time may be set according to at least one of an operating time and a use content of the application in the mobile terminal and then the connection to the public network may be established.

According to the second aspect of the present invention, the connection upper limit time may be set to be longer as the operating time of the application in the mobile terminal increases.

According to the second aspect of the present invention, the use content may include the number of reservations of a facility, or a frequency of reservations of the facility, the reservations of the facility being made using the application, and the connection upper limit time may be set to be longer as the number of reservations or the frequency of reservations increases.

According to the second aspect of the present invention, the use content may include at least one of a type of a reserved facility and a reserved use period of the reserved facility, the facility being reserved using the application in the mobile terminal, and the connection upper limit time may be set to be longer as the reserved use period or a use period estimated according to the type of the facility increases.

An application management device according to a third aspect of the present invention includes: a connection request reception unit that receives a connection request to a public network from a mobile terminal; an installation control unit that installs an application in the mobile terminal or transmits installation information if the connection request reception unit receives the connection request to the public network; and a connection request transmission unit that transmits the connection request to the public network to a public wireless LAN connection control device if the connection request reception unit receives the connection request to the public network.

An application management device according to a fourth aspect of the present invention includes: a connection request reception unit that receives a connection request to a public network from a mobile terminal; an installation control unit that installs an application in the mobile terminal or transmits installation information if the connection request reception unit receives the connection request to the public network; and a connection establishment unit that establishes a connection to the public network.

According to the present invention, it is possible to provide a technique for improving the awareness of applications for mobile terminals and popularizing the applications.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3 is a sequence diagram illustrating an illustrative processing flow in the public network connection control method according to a first embodiment;

DETAILED DESCRIPTION OF EMBODIMENTS

Hereinafter, embodiments for carrying out the present invention will be described with reference to the drawings. The following embodiments are illustrative embodiments of the present invention, and therefore the technical scope of the present invention should not be narrowly interpreted based on the embodiments.

<System Configuration>

Figure 1:
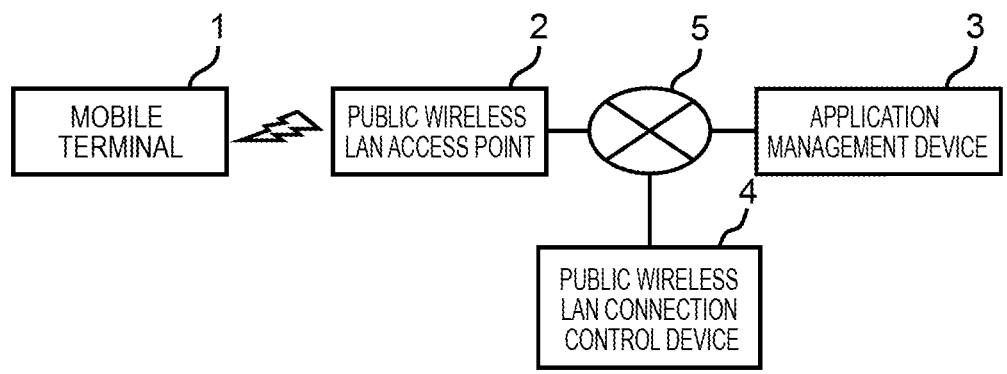
FIG. 1 is a diagram illustrating an illustrative system configuration for carrying out a public network connection control method.

Referring first to FIG. 1, a system configuration for carrying out a public network connection control method according to this embodiment will be described. A mobile terminal 1 can wirelessly communicate with a public wireless LAN access point 2. The public wireless LAN access point 2, an application management device 3, and a public wireless LAN connection control device 4 can communicate with each other via a public network 5.

Examples of the mobile terminal 1 include a smartphone, a mobile phone, a tablet computer, and a personal computer.

The installation location of the public wireless LAN access point 2 is not particularly limited, as long as the public wireless LAN access point 2 can be connected to a public network using a wireless LAN. The public wireless LAN access point 2 may be installed in a building, such as a commercial facility, a public transportation, a public facility, an accommodation, and a school, or may be installed in a carriage such as a vehicle and an aircraft.

The application management device 3 and the public wireless LAN connection control device 4 are server devices including an arithmetic device, such as a CPU, which executes arithmetic processing for a program, a storage device, such as a RAM, a ROM, and a hard disk, which stores computer programs and data, and a communication device that transmits or receives data via a network such as the Internet or a LAN.

<Functional Configuration>

Figure 2A:
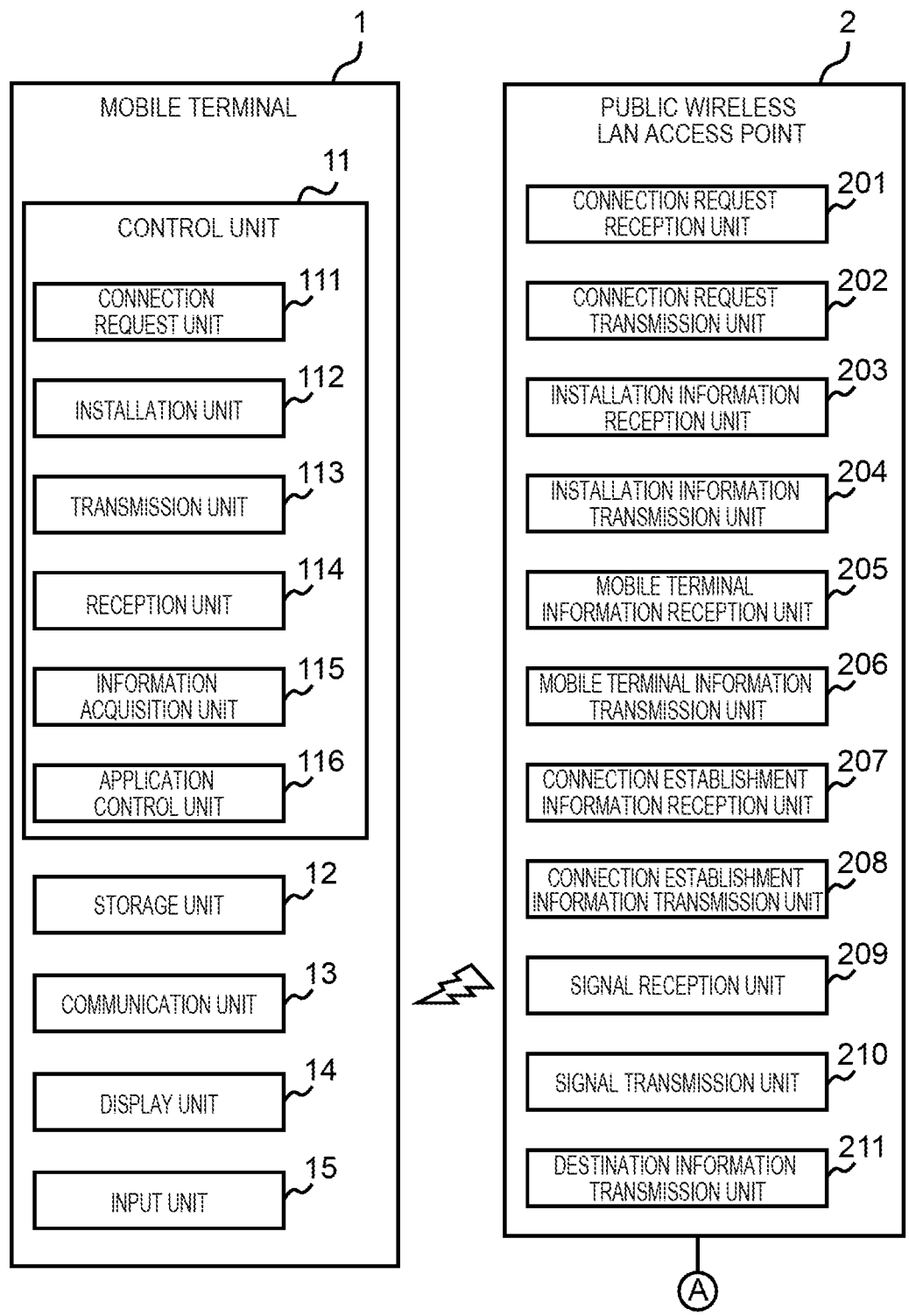
FIG. 2A is a block diagram illustrating illustrative functional configurations of a mobile terminal, a public wireless LAN access point, an application management device, and a public wireless LAN connection control device.
Figure 2B:
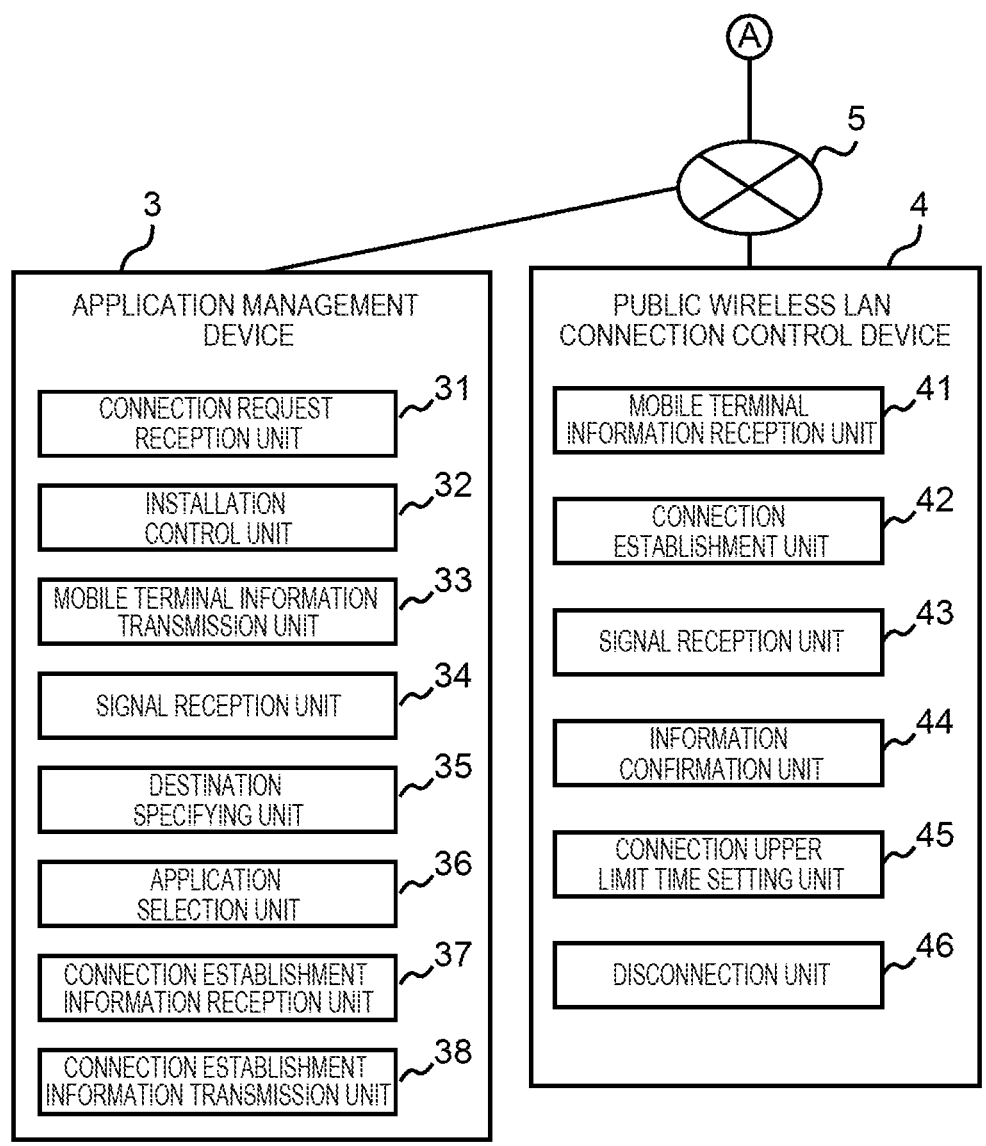
FIG. 2B is a block diagram illustrating illustrative functional configurations of the mobile terminal, the public wireless LAN access point, the application management device, and the public wireless LAN connection control device.

Referring next to FIGS. 2A and 2B, functional configurations of various types of equipment constituting a system for carrying out a public network connection control method according to this embodiment will be described. FIGS. 2A and 2B are block diagrams showing illustrative functional configurations of the mobile terminal 1, the public wireless LAN access point 2, the application management device 3, and the public wireless LAN connection control device 4.

The mobile terminal 1 includes a control unit 11, a storage unit 12, a communication unit 13, a display unit 14, and an input unit 15.

The control unit 11 includes an arithmetic device, such as a CPU (Central Processing Unit), which executes arithmetic processing for a program in the mobile terminal 1, and controls each unit included in the mobile terminal 1. Note that the arithmetic device includes a RAM which is used as a temporary storage area (work area) for processing. Further, the control unit 11 reads data, programs, and the like stored in the storage unit 12, and executes the data, programs and the like. The storage unit 12 is a non-volatile storage unit, such as a semiconductor memory, which stores programs for controlling various functions of an OS and the mobile terminal 1, and application data downloaded from the application management device 3.

The communication unit 13 performs communication with the public wireless LAN access point 2. The display unit 14 displays characters, images, and the like. The input unit 15 generates an input signal according to a user's input operation. The display unit 14 and the input unit 15 may be configured separately by providing the mobile terminal 1 with a display and operation buttons. The display unit 14 and the input unit 15 may be integrally formed by providing the mobile terminal 1 with a touch panel.

The control unit 11 includes a connection request unit 111, an installation unit 112, a transmission unit 113, and a reception unit 114. Specifically, the control unit 11 executes processing in accordance with various programs stored in the storage unit 12, thereby functioning as the connection request unit 111, the installation unit 112, the transmission unit 113, and the reception unit 114. The connection request unit 111 transmits a connection request to the public network 5 to the application management device 3 or the public wireless LAN connection control device 4 via the public wireless LAN access point 2. The connection request to the public network 5 is information indicating that the mobile terminal 1 requests a connection to the public network 5, and includes information capable of uniquely identifying the mobile terminal 1 which has sent the connection request. Examples of the information capable of uniquely identifying the mobile terminal 1 include an identification number or a MAC address unique to the mobile terminal.

The installation unit 112 receives, from the application management device 3, information necessary for installing an application (hereinafter referred to also as "installation information") and installs the application. Upon receiving the installation information, the installation unit 112 can transmit, to the application management device 3, a signal indicating that the installation information is received. Upon completion of the installation of the application, the installation unit 112 can transmit, to the application management device 3, a signal indicating that the application is installed.

The transmission unit 113 transmits various signals or information. For example, the transmission unit 113 can transmit, to the application management device 3 or the public wireless LAN connection control device 4, information about an application acquired by an information acquisition unit 115, which is described later, as a signal. The reception unit 114 receives connection establishment information necessary for the mobile terminal 1 to be connected to the public network 5.

Further, the control unit 11 may include the information acquisition unit 115, as needed. The information acquisition unit 115 acquires information about the application in the mobile terminal 1. The information acquisition unit 115 can acquire information about an application, such as information indicating that the application downloaded from the application management device 3 is installed, information indicating that the installed application has started to be used, and information indicating log-in to the application.

Further, the control unit 11 may include an application control unit 116, as needed. The application control unit 116 accepts browsing of the application installed from the application management device 3, and confirms whether or not the application is activated and logged in. Note that the connection request unit 111, the installation unit 112, the transmission unit 113, the reception unit 114, the information acquisition unit 115, the application control unit 116, and the like may be composed of one or more processors and a circuit included in peripheral circuits of the processor(s).

The public wireless LAN access point 2 includes a connection request reception unit 201, a connection request transmission unit 202, an installation information reception unit 203, an installation information transmission unit 204, a mobile terminal information reception unit 205, a mobile terminal information transmission unit 206, a connection establishment information reception unit 207, and a connection establishment information transmission unit 208.

The connection request reception unit 201 receives the connection request to the public network 5 from the mobile terminal 1, and the connection request transmission unit 202 transmits the connection request to the application management device 3. The installation information reception unit 203 receives, from the application management device 3, information necessary for the mobile terminal 1 to install an application, and the installation information transmission unit 204 transmits the information to the mobile terminal 1. The mobile terminal information reception unit 205 receives the connection request to the public network 5 from the mobile terminal 1, and the mobile terminal information transmission unit 206 transmits the connection request to the public network 5 to the application management device 3. The connection establishment information reception unit 207 receives, from the public wireless LAN connection control device 4, the connection establishment information necessary for the mobile terminal 1 to be connected to the public network 5, and the connection establishment information transmission unit 208 transmits the connection establishment information to the mobile terminal 1.

Further, the public wireless LAN access point 2 includes a signal reception unit 209 and a signal transmission unit 210. Note that the connection request reception unit 201, the connection request transmission unit 202, the installation information reception unit 203, the installation information transmission unit 204, the mobile terminal information reception unit 205, the mobile terminal information transmission unit 206, the connection establishment information reception unit 207, the connection establishment information transmission unit 208, the signal reception unit 209, the signal transmission unit 210, and the like may be composed of one or more processors and a circuit included in peripheral circuits of the processor(s). The signal reception unit 209 can receive a signal which has been transmitted from the installation unit 112 of the mobile terminal 1 and indicates that the application is installed in the mobile terminal 1, or a signal indicating that the mobile terminal 1 has received the installation information. Further, the signal reception unit 209 can receive a signal which has been transmitted from the transmission unit 113 of the mobile terminal 1 and indicates that the application is installed in the mobile terminal 1, a signal indicating that the mobile terminal 1 has started to use the application, or a signal indicating that the mobile terminal 1 has logged in to the application. The signal transmission unit 210 transmits the signal received by the signal reception unit 209 to the application management device 3.

The application management device 3 stores data on applications. The mobile terminal 1 can download the data on the application from the application management device 3 and install the downloaded data. The number of types of applications stored in the application management device 3 may be one, two, or more.

The application management device 3 includes a connection request reception unit 31, an installation control unit 32, and a mobile terminal information transmission unit 33. The connection request reception unit 31 receives the connection request to the public network 5 from the mobile terminal 1. The connection request may be received via the public wireless LAN access point 2. The installation control unit 32 transmits, to the mobile terminal 1, information necessary for the mobile terminal 1 to install an application. The information may be transmitted via the public wireless LAN access point 2. The mobile terminal information transmission unit (connection request transmission unit) 33 transmits the connection request to the public network 5 to the public wireless LAN connection control device 4.

Further, the application management device 3 may include a signal reception unit 34. The signal reception unit 34 can receive a signal indicating information about the mobile terminal 1. Specifically, the signal reception unit 34 can receive a signal indicating that the mobile terminal 1 has installed an application, a signal indicating that the mobile terminal 1 has received the installation information, a signal indicating that the application is installed in the mobile terminal 1, a signal indicating that the mobile terminal 1 has started to use the application, a signal indicating that the mobile terminal 1 has logged in to the application, and the like.

Further, the application management device 3 may include a connection establishment information reception unit 37 and a connection establishment information transmission unit 38. The connection establishment information reception unit 37 receives the connection establishment information from the connection establishment unit 42 of the public wireless LAN connection control device 4. The connection establishment information transmission unit 38 transmits, to the connection establishment information reception unit 207 of the public wireless LAN access point 2, the connection establishment information received by the connection establishment information reception unit 37.

When the public wireless LAN access point 2 is installed in a vehicle or an aircraft, the public wireless LAN access point 2 may include a destination information transmission unit 211. In this case, the application management device 3 includes a destination specifying unit 35 and an application selection unit 36. Note that the destination information transmission unit 211 included in the public wireless LAN access point 2, the destination specifying unit 35 and the application selection unit 36 included in the application management device 3, and the like may be composed of one or more processors and a circuit included in peripheral circuits of the processor(s). The destination information transmission unit 211 transmits information about a destination of a vehicle or an aircraft to the application management device 3. The destination specifying unit 35 of the application management device 3 receives the information about the destination of the vehicle or aircraft, and identifies the destination of the vehicle or aircraft. The application selection unit 36 selects an application to be installed in the mobile terminal 1 depending on the destination.

When the mobile terminal 1 is connected to the public network 5 via the public wireless LAN access point 2, the public wireless LAN connection control device 4 has a function for controlling the connection. The public wireless LAN connection control device 4 includes a mobile terminal information reception unit 41 and a connection establishment unit 42. The mobile terminal information reception unit 41 receives the connection request to the public network 5 from the mobile terminal 1 or the application management device 3. The connection establishment unit 42 establishes a connection between the mobile terminal 1 and the public network 5 via the public wireless LAN access point 2.

Further, the public wireless LAN connection control device 4 may include, as needed, a signal reception unit 43, an information confirmation unit 44, a connection upper limit time setting unit 45, and a disconnection unit 46. Note that the mobile terminal information reception unit 41, the connection establishment unit 42, the signal reception unit 43, the information confirmation unit 44, the connection upper limit time setting unit 45, the disconnection unit 46, and the like may be composed of one or more processors and a circuit included in peripheral circuits of the processor(s). The signal reception unit 43 can receive a signal indicating that an application is installed in the mobile terminal 1, or a signal indicating that the mobile terminal 1 has received installation information.

The information confirmation unit 44 can confirm the information included in the signal received by the signal reception unit 43. For example, the information confirmation unit 44 can confirm whether or not the signal received by the signal reception unit 43 includes information indicating that the application is installed, information indicating that the application has started to be used, information indicating that the application is logged in, and the like. The connection upper limit time setting unit 45 sets a connection upper limit time for the connection from the mobile terminal 1 to the public network 5 when the information about the mobile terminal 1 does not include information indicating that the application is logged in. The disconnection unit 46 accumulates the connection time of the connection from the mobile terminal 1 to the public network 5. When the connection upper limit time is reached, the connection between the mobile terminal 1 and the public network 5 is disconnected.

<Operation>

Referring next to FIG. 3, an operation of a system for carrying out the public network connection control method according to a first embodiment will be described. FIG. 3 is a sequence diagram illustrating an illustrative processing flow in the public network connection control method according to the first embodiment.

The mobile terminal 1 can transmit data to the application management device 3 and receive data therefrom via the public wireless LAN access point 2. On the other hand, the mobile terminal 1 is not allowed to perform communication other than the communication with the application management device 3 via the public wireless LAN access point 2.

As shown in FIG. 3, the connection request unit 111 of the mobile terminal 1 transmits a connection request to the public network 5 to the public wireless LAN access point 2, and the connection request reception unit 201 of the public wireless LAN access point 2 receives the connection request (step S101). The connection request transmission unit 202 of the public wireless LAN access point 2 transmits the connection request to the application management device 3, and the connection request reception unit 31 of the application management device 3 receives the connection request (step S102).

The installation control unit 32 of the application management device 3 transmits, to the public wireless LAN access point 2, information (installation information) necessary for the mobile terminal 1 to install an application, and the installation information reception unit 203 of the public wireless LAN access point 2 receives the installation information (step S103). The installation information transmission unit 204 of the public wireless LAN access point 2 transmits the installation information to the mobile terminal 1 (step S104). The installation unit 112 of the mobile terminal 1 receives the installation information and installs the application (step S105).

Note that the public wireless LAN access point 2 need not necessarily to confirm whether the mobile terminal 1 has installed the application, and may receive a signal indicating that the mobile terminal 1 has received the installation information (step S105 is omitted). Specifically, the installation unit 112 of the mobile terminal 1 may employ a configuration in which a signal indicating that the installation information is received is transmitted to the public wireless LAN access point 2 at the time when the installation information is received, without waiting for the completion of the installation, and the signal reception unit 209 of the public wireless LAN access point 2 receives the signal.

Further, the public wireless LAN access point 2 may transmit, to the application management device 3, a signal indicating that the mobile terminal 1 has installed the application (step S107 described later) regardless of whether or not the application is installed in the mobile terminal 1 (steps S105 and S106 are omitted). Specifically, the signal transmission unit 210 of the public wireless LAN access point 2 may employ a configuration in which a signal indicating that the mobile terminal 1 has installed the application, regardless of whether or not the installation unit 112 of the mobile terminal 1 has installed the application, at the same time of step S104, or after completion of step S104.

After completion of the installation (step S105), the installation unit 112 of the mobile terminal 1 transmits a signal indicating the completion of the installation to the public wireless LAN access point 2, and the signal reception unit 209 of the public wireless LAN access point 2 receives the signal (step S106). The signal transmission unit 210 of the public wireless LAN access point 2 transmits the signal indicating the completion of the installation to the application management device 3, and the signal reception unit 34 of the application management device 3 receives the signal (step S107). The mobile terminal information transmission unit 33 of the application management device 3 transmits a connection request to the public network 5 to the public wireless LAN connection control device 4, and the mobile terminal information reception unit 41 of the public wireless LAN connection control device 4 receives the connection request to the public network 5 (step S108). In this case, the connection request includes information about the mobile terminal 1, and includes an individual identification number or an IP address which is information capable of uniquely identifying the mobile terminal 1.

The connection establishment unit 42 of the public wireless LAN connection control device 4 transmits, to the public wireless LAN access point 2, the connection establishment information necessary for establishing a connection between the mobile terminal 1 and the public network 5, and the connection establishment information reception unit 207 of the public wireless LAN access point 2 receives the connection establishment information (step S109). The connection establishment information transmission unit 208 of the public wireless LAN access point 2 transmits the connection establishment information to the mobile terminal 1, and the reception unit 114 of the mobile terminal 1 receives the connection establishment information (step S110). The above-described procedure enables the mobile terminal 1 to be connected to the public network 5 via the public wireless LAN access point 2.

Note that the public wireless LAN connection control device 4 may transmit the connection establishment information to the public wireless LAN access point 2 via the application management device 3 (division of step S109). Specifically, the connection establishment unit 42 of the public wireless LAN connection control device 4 may employ a configuration in which the connection establishment information is transmitted to the connection establishment information reception unit 37 of the application management device 3 and the connection establishment information is transmitted from the connection establishment information transmission unit 38 of the application management device 3 to the connection establishment information reception unit 207 of the public wireless LAN access point 2.

In this embodiment, it is necessary to install an application from the application management device 3 so as to establish a connection to the public network 5, and the user who owns the mobile terminal 1 inevitably recognizes the application. Accordingly, it is possible for an application provider to improve the awareness of the application and popularize the application.

In this embodiment, the type of the application is not particularly limited. Examples of the application include applications for shop search capable of searching a desired shop by specifying conditions. Examples of the applications for shop search include applications for restaurant search. In other words, the applications are applications other than applications for communication that enable communication with the public network 5. Note that facilities that can be searched by the application are not limited to restaurants, but instead may include various facilities such as a hotel, karaoke, a golf course, and a sports facility. Further, the application makes it possible not only to provide information about the facility, but also to receive a reservation for the facility.

The acquisition of new users of applications for shop search has been competitive, which makes it difficult to differentiate the applications from other applications using only conventional marketing techniques such as promotion and advertising. However, according to this embodiment, it is possible to make users to recognize applications by an approach different from that of the conventional one, which contributes to the acquisition of new users of the applications.

Figure 4:
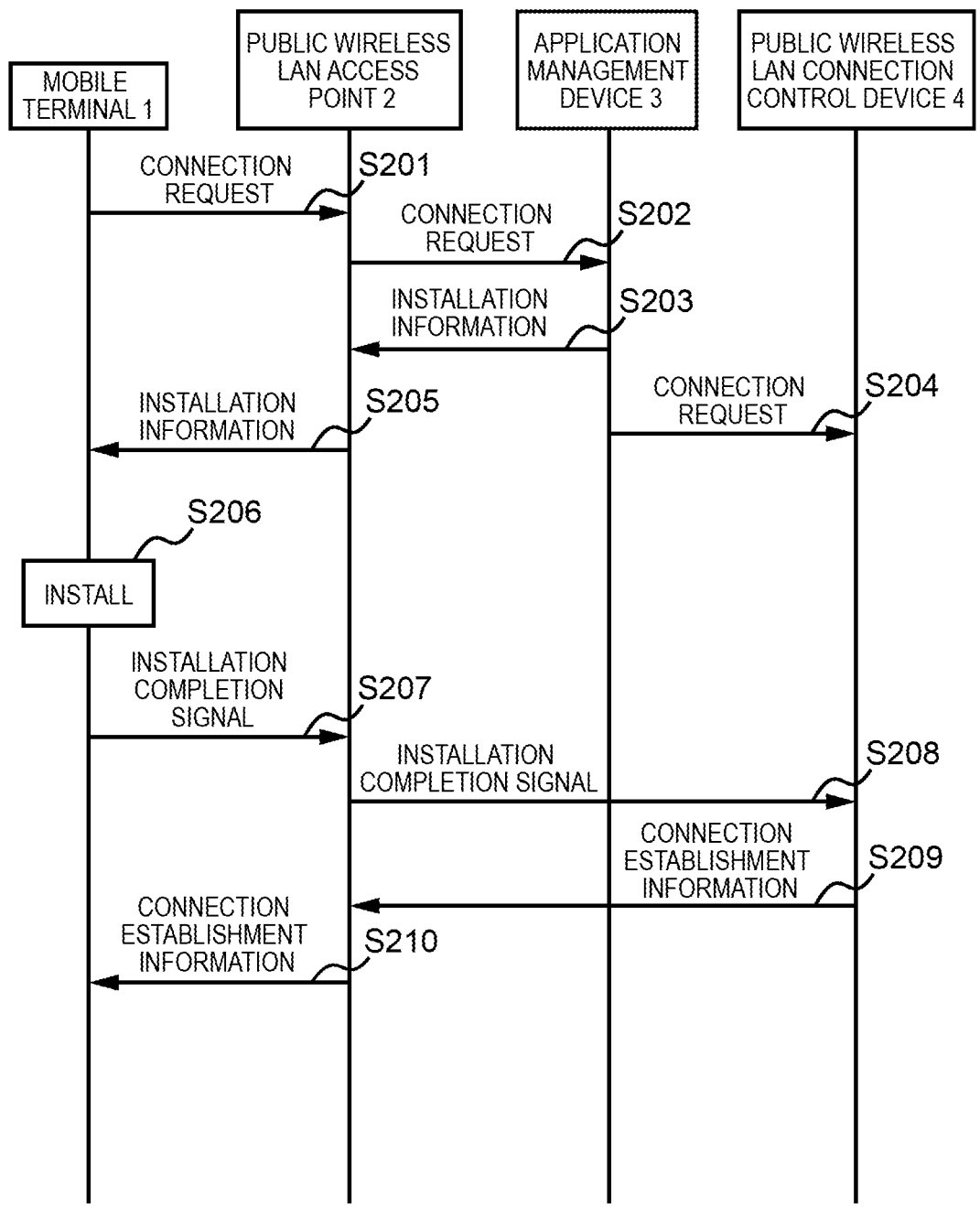
FIG. 4 is a sequence diagram showing an illustrative processing flow in a public network connection control method according to a first modified example of the first embodiment.

Referring next to FIG. 4, an operation of a system for carrying out a public network connection control method according to a first modified example of the first embodiment will be described. Note that differences between the following embodiments and the first embodiment will be described below, and components of the following embodiments that are similar to those of the first embodiment are denoted by the same reference numerals and descriptions thereof are omitted. FIG. 4 is a sequence diagram showing an illustrative processing flow in a public network connection control method according to a first modified example of the first embodiment.

In the first embodiment shown in FIG. 3, when the mobile terminal 1 has installed the application, the application management device 3 transmits the connection request to the public network 5 to the public wireless LAN connection control device 4. In the first modified example of the first embodiment shown in FIG. 4, when the installation information is transmitted to the mobile terminal 1, the application management device 3 transmits the connection request to the public network 5 to the public wireless LAN connection control device 4.

The connection request unit 111 of the mobile terminal 1 transmits the connection request to the public network 5 to the public wireless LAN access point 2, and the connection request reception unit 201 of the public wireless LAN access point 2 receives the connection request (step S201). The connection request transmission unit 202 of the public wireless LAN access point 2 transmits the connection request to the application management device 3, and the connection request reception unit 31 of the application management device 3 receives the connection request (step S202).

The installation control unit 32 of the application management device 3 transmits the installation information to the public wireless LAN access point 2, and the installation information reception unit 203 of the public wireless LAN access point 2 receives the installation information (step S203). In step S203, when the installation control unit 32 transmits the installation information, the mobile terminal information transmission unit 33 of the application management device 3 transmits the connection request to the public network 5 to the public wireless LAN connection control device 4, and the mobile terminal information reception unit 41 of the public wireless LAN connection control device 4 receives the connection request to the public network 5 (step S204).

Note that step S204 may be executed between step S202 and step S203. Specifically, after receiving the connection request to the public network 5 (after step S202) and before transmitting the installation information (before step S203), the application management device 3 may transmit the connection request to the public network 5 to the public wireless LAN connection control device 4. Alternatively, step S204 may be executed simultaneously with step S203.

The installation information transmission unit 204 of the public wireless LAN access point 2 transmits the installation information to the mobile terminal 1 (step S205). The installation unit 112 of the mobile terminal 1 receives the installation information and installs the application (step S206). Note that the processing of step S204 may be executed before step S205, or the processing of step S205 may be executed before step S204.

After completion of the installation, the installation unit 112 of the mobile terminal 1 transmits a signal indicating the completion of the installation to the public wireless LAN access point 2, and the signal reception unit 209 of the public wireless LAN access point 2 receives the signal (step S207). The signal transmission unit 210 of the public wireless LAN access point 2 transmits a signal indicating the completion of the installation to the public wireless LAN connection control device 4, and the signal reception unit 43 of the public wireless LAN connection control device 4 receives the signal (step S208).

Note that in step S208, the public wireless LAN access point 2 may transmit a signal indicating the completion of the installation to the public wireless LAN connection control device 4 via the application management device 3. Specifically, the signal reception unit 34 of the application management device 3 may receive the signal indicating the completion of the installation, and the mobile terminal information transmission unit 33 may transmit the signal to the public wireless LAN connection control device 4. With this configuration, the application management device 3 can acquire the signal indicating the completion of the installation in the mobile terminal 1.

The connection establishment unit 42 of the public wireless LAN connection control device 4 transmits the connection establishment information to the public wireless LAN access point 2, and the connection establishment information reception unit 207 of the public wireless LAN access point 2 receives the connection establishment information (step S209). The connection establishment information transmission unit 208 of the public wireless LAN access point 2 transmits the connection establishment information to the mobile terminal 1, and the reception unit 114 of the mobile terminal 1 receives the connection establishment information (step S210). The above-described procedure enables the mobile terminal 1 to be connected to the public network 5 via the public wireless LAN access point 2.

Note that in step S209, the public wireless LAN connection control device 4 may transmit connection establishment information to the public wireless LAN access point 2 via the application management device 3. Specifically, a configuration may be employed in which the connection establishment unit 42 of the public wireless LAN connection control device 4 transmits the connection establishment information to the connection establishment information reception unit 37 of the application management device 3, and the connection establishment information transmission unit 38 of the application management device 3 transmits the connection establishment information to the connection establishment information reception unit 207 of the public wireless LAN access point 2.

Figure 5:
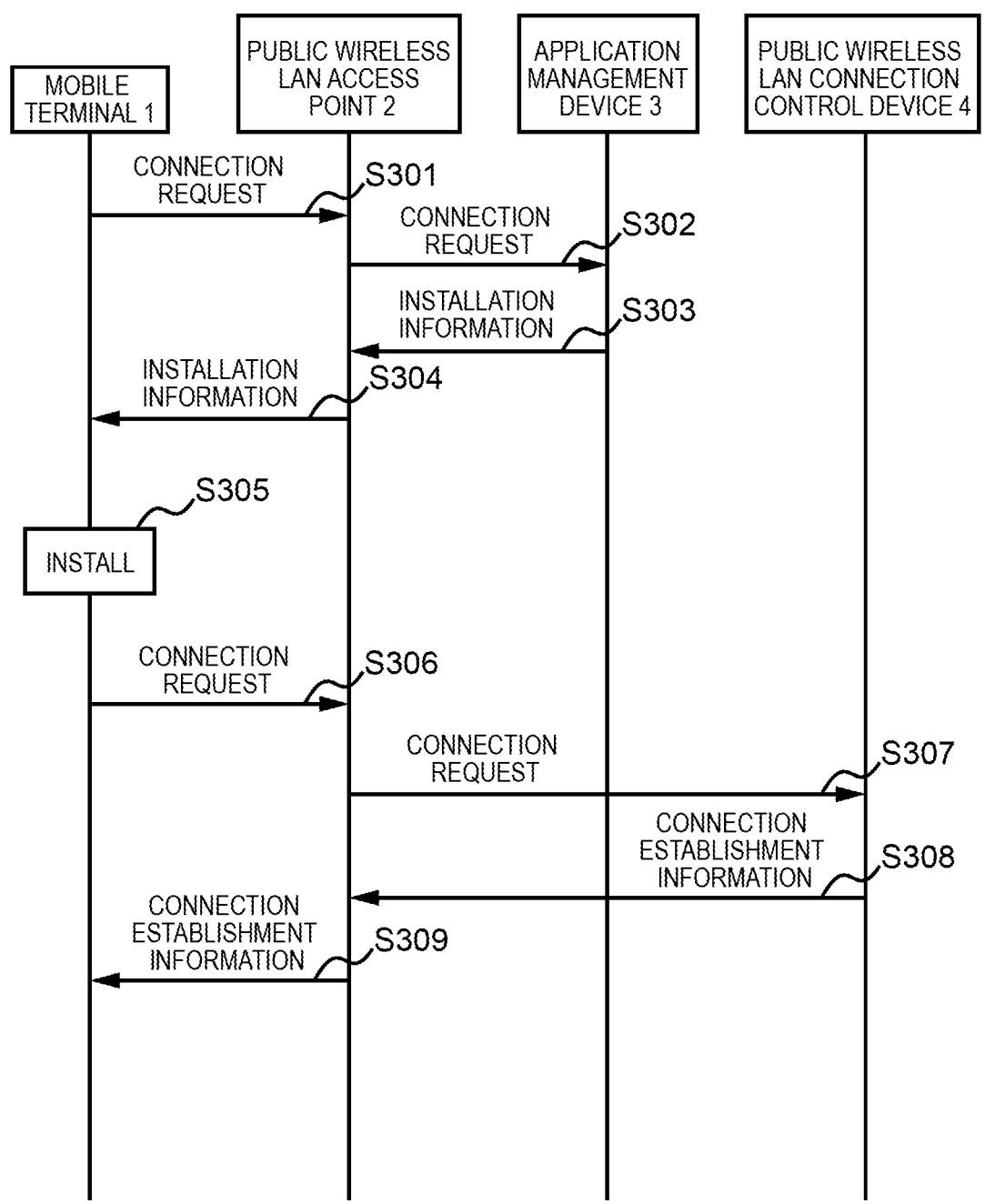
FIG. 5 is a sequence diagram illustrating an illustrative processing flow in a public network connection control method according to a second embodiment.

Referring next to FIG. 5, an operation of a system for carrying out a public network connection control method according to a second embodiment will be described. FIG. 5 is a sequence diagram illustrating an illustrative processing flow in the public network connection control method according to the second embodiment.

In the first embodiment shown in FIG. 3 and the first modified example shown in FIG. 4, the public wireless LAN connection control device 4 receives the connection request to the public network 5 from the application management device 3, while in the second embodiment shown in FIG. 5, the connection request is received from the mobile terminal 1.

The connection request unit 111 of the mobile terminal 1 transmits the connection request to the public network 5 to the public wireless LAN access point 2, and the connection request reception unit 201 of the public wireless LAN access point 2 receives the connection request (step S301). The connection request transmission unit 202 of the public wireless LAN access point 2 transmits the connection request to the application management device 3, and the connection request reception unit 31 of the application management device 3 receives the connection request (step S302).

The installation control unit 32 of the application management device 3 transmits the installation information to the public wireless LAN access point 2, and the installation information reception unit 203 of the public wireless LAN access point 2 receives the installation information (step S303). The installation information transmission unit 204 of the public wireless LAN access point 2 transmits the installation information to the mobile terminal 1 (step S304). The installation unit 112 of the mobile terminal 1 receives the installation information and installs the application (step S305).

After completion of the installation, the connection request unit 111 of the mobile terminal 1 transmits the connection request to the public network 5 to the public wireless LAN access point 2, and the connection request reception unit 201 of the public wireless LAN access point 2 receives the connection request to the public network 5 (step S306). The connection request transmission unit 202 of the public wireless LAN access point 2 transmits the connection request to the public network 5 to the public wireless LAN connection control device 4, and the mobile terminal information reception unit 41 of the public wireless LAN connection control device 4 receives the connection request to the public network 5 (step S307).

Note that in step S307, the public wireless LAN access point 2 may transmit the connection request to the public wireless LAN connection control device 4 via the application management device 3. Specifically, a configuration may be employed in which the connection request transmission unit 202 of the public wireless LAN access point 2 transmits the connection request to the public network 5 to the connection request reception unit 31 of the application management device 3, and the mobile terminal information transmission unit 33 of the application management device 3 transmits the connection request to the mobile terminal information reception unit 41 of the public wireless LAN connection control device 4.

The connection establishment unit 42 of the public wireless LAN connection control device 4 transmits, to the public wireless LAN access point 2, the connection establishment information necessary for establishing a connection between the mobile terminal 1 and the public network 5, and the connection establishment information reception unit 207 of the public wireless LAN access point 2 receives the connection establishment information (step S308). The connection establishment information transmission unit 208 of the public wireless LAN access point 2 transmits the connection establishment information to the mobile terminal 1, and the reception unit 114 of the mobile terminal 1 receives the connection establishment information (step S309). The above-described procedure enables the mobile terminal 1 to be connected to the public network 5 via the public wireless LAN access point 2.

Note that in step S308, the public wireless LAN connection control device 4 may transmit the connection establishment information to the public wireless LAN access point 2 via the application management device 3. Specifically, a configuration may be employed in which the connection establishment unit 42 of the public wireless LAN connection control device 4 transmits the connection establishment information to the connection establishment information reception unit 37 of the application management device 3, and the connection establishment information transmission unit 38 of the application management device 3 transmits the connection establishment information to the connection establishment information reception unit 207 of the public wireless LAN access point 2.

Figure 6:
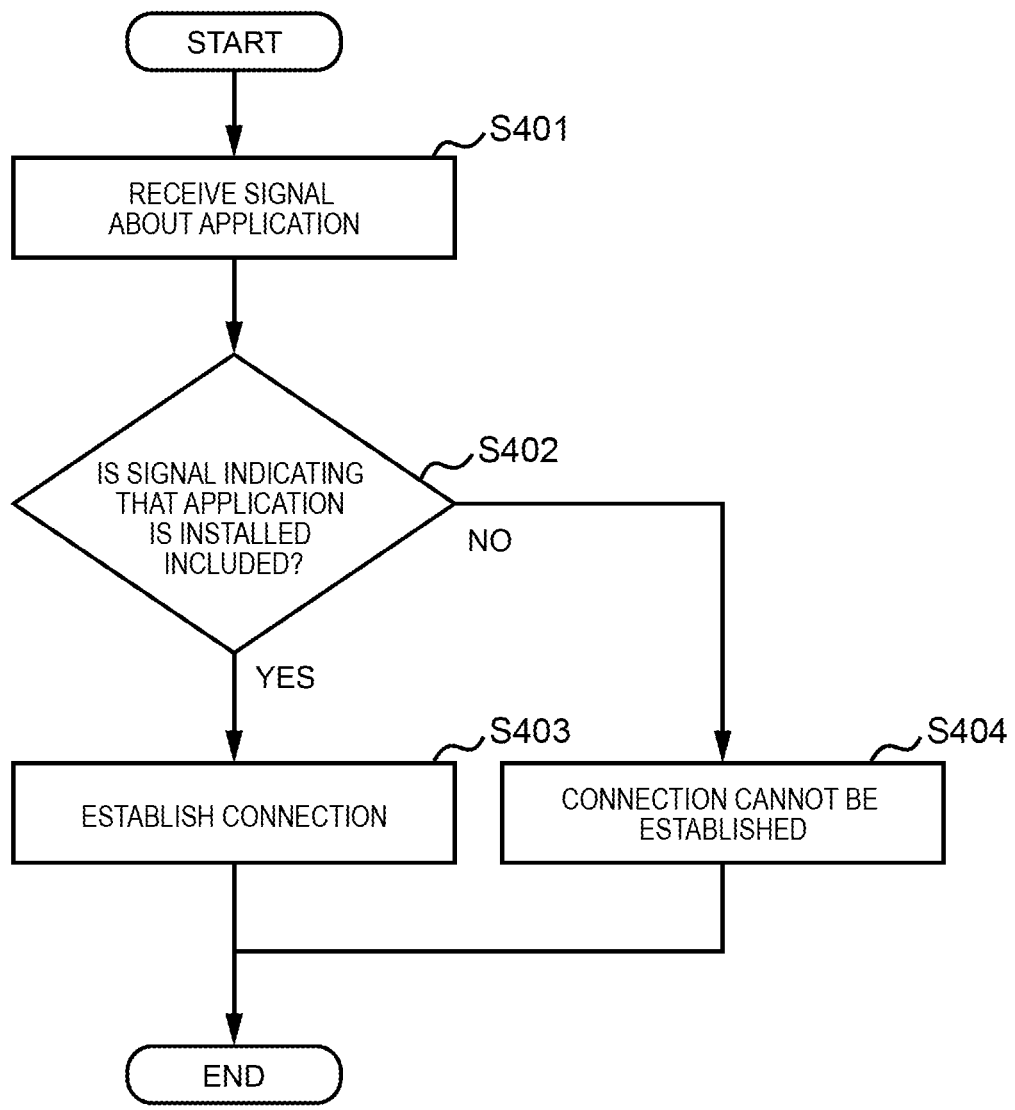
FIG. 6 is a flowchart illustrating an illustrative processing procedure in an application management device and a public wireless LAN connection control device according to a third embodiment.

Referring next to FIG. 6, a public network connection control method according to a third embodiment will be described. FIG. 6 is a flowchart illustrating an illustrative processing procedure in the application management device 3 and the public wireless LAN connection control device 4 according to the third embodiment.

In this embodiment, configurations of the mobile terminal 1, the public wireless LAN access point 2, the application management device 3, and the public wireless LAN connection control device 4 are basically similar to those of the first embodiment or the second embodiment, except that the mobile terminal 1 further includes the information acquisition unit 115. The information acquisition unit 115 acquires information about the application in the mobile terminal 1. The transmission unit 113 of the mobile terminal 1 transmits the information about the application acquired by the information acquisition unit 115 to the application management device 3 as a signal, and the signal reception unit 34 of the application management device 3 receives the signal. The transmission unit 113 of the mobile terminal 1 may transmit the signal at any timing, as long as the signal is transmitted before the public wireless LAN connection control device 4 transmits the connection establishment information.

As shown in FIG. 6, this embodiment is described mainly based on the application management device 3 and the public wireless LAN connection control device 4. The signal reception unit 34 of the application management device 3 receives a signal about the application in the mobile terminal 1 (step S401). The mobile terminal 1 is a mobile terminal that requests a connection to the public network 5. The signal reception unit 34 of the application management device 3 confirms the information about the application, and confirms whether or not the application downloaded from the application management device 3 includes a signal indicating that the application is installed in the mobile terminal 1 (step S402). When the application includes the signal indicating that the application is installed in the mobile terminal 1 (step S402: Yes), the connection establishment unit 42 of the public wireless LAN connection control device 4 establishes a connection between the mobile terminal 1 and the public network 5 via the public wireless LAN access point 2 (step S403), and when the connection is established, the processing ends.

On the other hand, when the application does not include the signal indicating that the application is installed in the mobile terminal 1, or when the application is uninstalled from the mobile terminal 1 (step S402: No), the connection between the mobile terminal 1 and the public network 5 is not established (step S404), and the processing ends.

This embodiment is on the condition that, in the case of establishing a connection to the public network 5, an application is downloaded to the mobile terminal 1 from the application management device 3. Accordingly, if the application is uninstalled from the mobile terminal 1 by the user, the connection to the public network 5 cannot be established. Therefore, according to this embodiment, a situation where the user uninstalls an application from his/her mobile terminal is prevented and the opportunity for the user to use the application is increased, thereby prompting the user to continuously use the application.

Further, in this embodiment, instead of setting the condition that a signal indicating that the application is installed is included, a condition that a signal indicating that the application has started to be used is included may be set. In this case, the mobile terminal 1 includes the application control unit 116 that accepts browsing of the application.

Means for accepting browsing of the application is not particularly limited. For example, the application control unit 116 may cause the display unit 14 of the mobile terminal 1 to display an operation button for selecting whether or not to use the application, and the input unit 15 may detect that the operation button indicating that the application is used is selected, thereby accepting browsing of the application.

In the condition described above, in order to establish the connection from the mobile terminal 1 to the public network 5, it is necessary not only to install the application, but also to start the use of the application. Accordingly, it is possible to prompt the user who owns the mobile terminal 1 to use the application and actually experience the operation of the application.

Further, in this embodiment, instead of setting the condition that a signal indicating that the application is installed is included, a condition that a signal indicating a log-in to the application is included may be set. In this case, the mobile terminal 1 includes the application control unit 116 that confirms whether or not the application is activated and logged in.

In the condition described above, in order to establish the connection from the mobile terminal 1 to the public network 5, it is necessary to log in to the application. Accordingly, it is possible to prompt the user who owns the mobile terminal 1 to use the application and actually experience the operation of the application. Additionally, the application provider can acquire the log-in user, which makes it possible to accumulate, in the application management device 3, information such as an access log and a user attribute which are associated with log-in information, and to utilize these pieces of information so as to further improve the awareness of the application.

Figure 7:
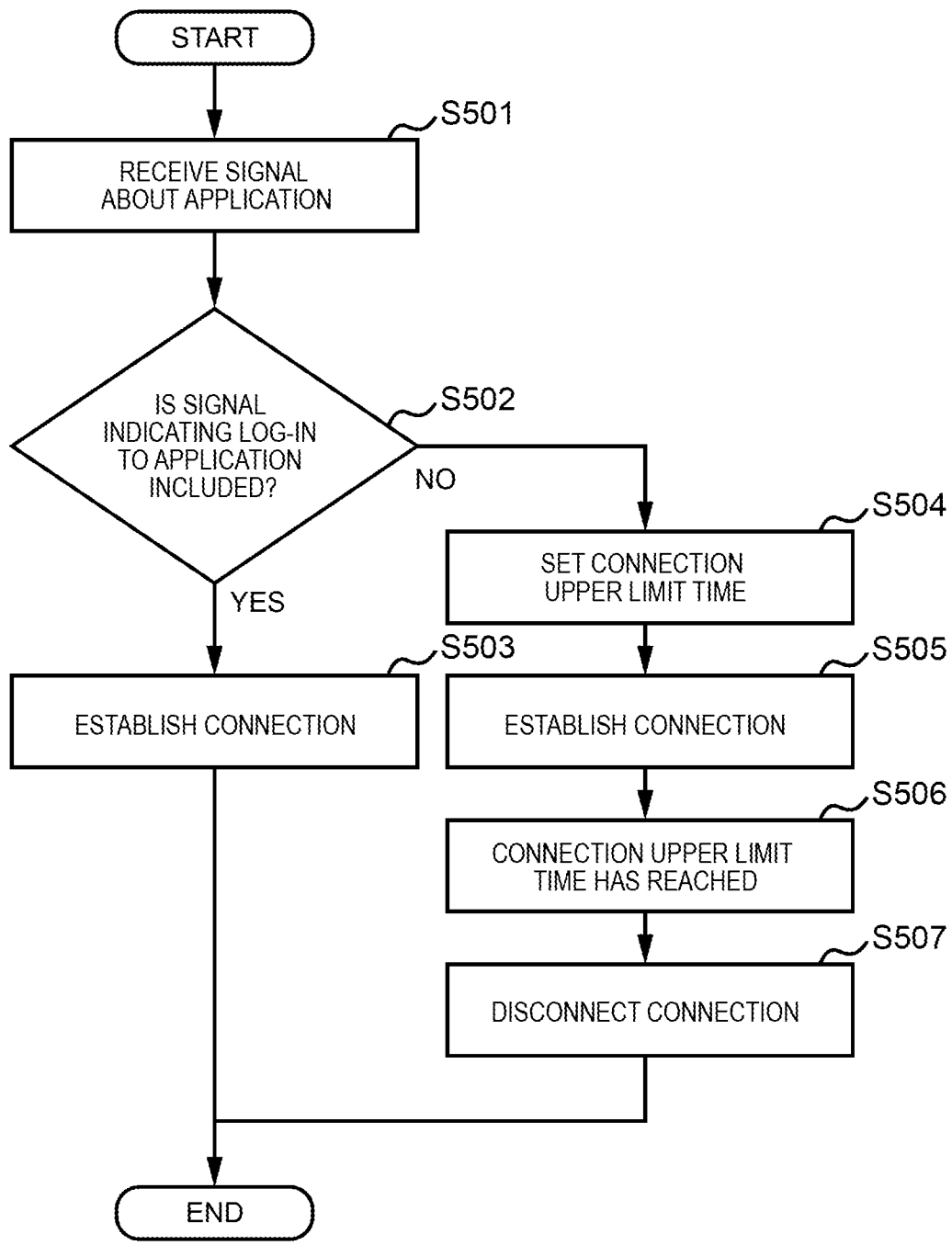
FIG. 7 is a flowchart illustrating an illustrative processing procedure in an application management device and a public wireless LAN connection control device according to a fourth embodiment.

Referring next to FIG. 7, a public network connection control method according to a fourth embodiment will be described. FIG. 7 is a flowchart illustrating an illustrative processing procedure in the application management device 3 and public wireless LAN connection control device 4 according to the fourth embodiment. The configurations of the mobile terminal 1, the public wireless LAN access point 2, the application management device 3, and the public wireless LAN connection control device 4 of this embodiment are similar to those of the third embodiment.

As shown in FIG. 7, this embodiment is described mainly based on the application management device 3 and the public wireless LAN connection control device 4. The signal reception unit 34 of the application management device 3 receives information about the application in the mobile terminal 1 (step S501). The mobile terminal 1 is a mobile terminal that requests a connection to the public network 5. The signal reception unit 34 of the application management device 3 confirms the information about the application, and confirms whether or not the signal indicating that the mobile terminal 1 has logged in to the application is included in the information (step S502). When the signal indicating that the mobile terminal 1 has logged in to the application is included in the information (step S502: Yes), the connection establishment unit 42 of the public wireless LAN connection control device 4 establishes a connection between the mobile terminal 1 and the public network 5 via the public wireless LAN access point 2 (step S503), and when the connection is established, the processing ends.

On the other hand, when the signal indicating that the mobile terminal 1 has logged in to the application is not included in the information, i.e., when the mobile terminal 1 has not logged in to the application (step S502: No), the connection upper limit time setting unit 45 of the public wireless LAN connection control device 4 sets a connection upper limit time for the connection from the mobile terminal 1 to the public network 5 (step S504). The connection establishment unit 42 establishes a connection between the mobile terminal 1 and the public network 5 via the public wireless LAN access point 2 (step S505). The disconnection unit 46 accumulates the connection time of the connection from the mobile terminal 1 to the public network 5. When the total connection time reaches the connection upper limit time (step S506), the connection is disconnected (step S507) and the processing ends.

In this embodiment, when the application is not logged in, an upper limit is set for the connection time of the connection to the public network 5. With this configuration, it is possible to give the user who owns the mobile terminal 1 a motivation to log in to the application, and to increase the number of log-in users.

In the embodiments described above, the public wireless LAN access point 2 may be installed in a vehicle or an aircraft. The vehicle is not particularly limited, as long as it is a carriage with wheels. Examples of the vehicle include a railway vehicle, train, and an automobile. The aircraft is not particularly limited, as long as it can fly in the air with passengers on board. Examples of the aircraft include an airplane, a helicopter, an airship, and a glider.

The method for setting the connection upper limit time is not limited to the method described above. For example, the connection upper limit time setting unit 45 of the public wireless LAN connection control device 4 records, as a usage history for each mobile terminal 1, the operating time and the use content of the application in the mobile terminal 1. Further, the connection upper limit time setting unit 45 may set the connection upper limit time according to the usage history when the connection upper limit time for the connection from the mobile terminal 1 to the public network 5 is set. Thus, the connection establishment unit 42 and the disconnection unit 46 establish the connection to the public network until the connection upper limit time is reached. Accordingly, it is possible to provide the user with an opportunity to use the public network based on the user's experience of using the application, and to prompt the user to use the application. Note that the usage history may include at least one of the operating time and the use content.

More specifically, the connection upper limit time setting unit 45 may set the connection upper limit time to be longer as the operating time of the application in the mobile terminal 1 increases. This makes it possible to prompt the user to use the application for a long period of time, and to increase the time for browsing an information provision screen displayed by the application. Specifically, since it is possible to present a large number of pieces of information to the user by using the application, the effect of advertising, for example, a facility displayed on the information provision screen can be increased. When the use content indicates the number of reservations or the frequency of reservations of the facility reserved using the application, the connection upper limit time setting unit 45 may set the connection upper limit time to be longer as the number of reservations or the frequency of reservations increases. Thus, it is possible not only to prompt the user to use the application, but also to effectively prompt the user to actually reserve a facility using the application.

The use content may include at least one of a type of a reserved facility, which is reserved using the application in the mobile terminal, and a reserved use period of the facility. The connection upper limit time setting unit 45 may set the connection upper limit time to be longer as a reserved use period or a use period estimated according to the type of the facility increases. Note that the reserved use period is a period in which the facility to be reserved is used. Examples of the type of the facility include various types of facilities, such as a restaurant, a hotel, karaoke, a golf course, and a sports facility. The reserved use period can be estimated according to the type of the facility. For example, when the type of the facility is a hotel, use of the facility for at least two days is estimated. When the type of the facility is a restaurant, use of the facility for several hours is estimated. Thus, the length of the connection upper limit time can be changed depending on the importance of the content of the reservation made using the application.

Next, a public network connection control method according to a fifth embodiment will be described. In this embodiment, the user who owns the mobile terminal 1 is on board the vehicle or the aircraft in which the public wireless LAN access point 2 is installed. The application management device 3 stores data on two or more types of applications.

In this embodiment, the mobile terminal 1, the public wireless LAN access point 2, the application management device 3, and the public wireless LAN connection control device 4 can employ the configurations in the embodiments described above. The public wireless LAN access point 2 further includes the destination information transmission unit 211, and the application management device 3 further includes the destination specifying unit 35 and the application selection unit 36.

When the connection request reception unit 201 of the public wireless LAN access point 2 receives the connection request to the public network 5 from the mobile terminal 1 and the connection request transmission unit 202 transmits the connection request to the application management device 3, the destination information transmission unit 211 of the public wireless LAN access point 2 transmits information about the destination of the vehicle or aircraft to the application management device 3. The destination specifying unit 35 of the application management device 3 receives the information about the destination of the vehicle or aircraft and identifies the destination of the vehicle or aircraft. The application selection unit 36 of the application management device 3 selects an application to be installed in the mobile terminal 1 depending on the destination. After that, the installation control unit 32 of the application management device 3 transmits the installation information about the selected application to the mobile terminal 1. The subsequent procedure is similar to the processing procedure in the embodiments described above.

The information about the destination of the vehicle or aircraft that is transmitted from the destination information transmission unit 211 includes information capable of identifying the destination of the vehicle or aircraft. Examples of the invention include information associated with the name of the vehicle, the flight number of the aircraft, and year, month, and date.

Examples of the destination of the vehicle or aircraft identified by the destination specifying unit 35 include the name of an arrival station or an airport, and the name of an area or a country in which the arrival station or the airport are located.

The following embodiment illustrates an example in which an application for shop search is used as the application to be installed in the mobile terminal 1 and the application management device 3 stores various types of applications for each area in which shops are located.

The application management device 3 stores two types of applications, i.e., an application for shop search for A-area in which a shop located in the A-area is registered, and a shop application for B-area in which a shop located in the B-area is registered. When the destination identified by the destination specifying unit 35 of the application management device 3 is the A-area, the application selection unit 36 selects the application for shop search for A-area from the two types of applications stored in the application management device 3.

In this embodiment, the application is selected depending on the destination of the vehicle or aircraft carrying the user and the application is installed in the mobile terminal 1, which makes it possible to increase the possibility that the user may continuously use the application after arriving at the destination. Further, since the connection to the public network 5 is established only for the mobile terminal 1 of the user who has installed the application, the number of times of communication with the public network 5 is reduced, which leads to a reduction in a load on the public wireless LAN access point 2 and the public network 5, as well as on a communication line between the public wireless LAN access point 2 and the public network 5. Furthermore, the reduction in the load leads to an increase in communication speed.

The embodiments described above have a configuration in which the application management device 3 and the public wireless LAN connection control device 4 are disposed separately from each other. However, the embodiments are not limited to this configuration. In other words, the application management device 3 and the public wireless LAN connection control device 4 may be integrated with each other. In this case, the transmission of information between the application management device 3 and the public wireless LAN connection control device 4 may be omitted. For example, step S108 and step S109 shown in FIG. 3 may be combined with each other. More specifically, when a notification about the completion of the installation is received, the connection establishment information is transmitted to the public wireless LAN access point 2 in the subsequent step.

Further, in the first embodiment and modified examples thereof shown in FIGS. 3 to 5 and in the second embodiment, when the mobile terminal 1 receives the installation information and the application management device 3 confirms that the mobile terminal 1 has installed the application, the connection of the mobile terminal 1 to the public network 5 is allowed. However, if it is only intended to obtain the effect of prompting the user to install the application, there is no need to confirm whether or not the application has been installed. In other words, the connection to the public network 5 of the mobile terminal 1 may be allowed when the installation information is transmitted to the mobile terminal 1.

Details thereof will be described based on a modified example of the first embodiment shown in FIG. 4. The connection request unit 111 of the mobile terminal 1 transmits the connection request to the public network 5 to the public wireless LAN access point 2, and the connection request reception unit 201 of the public wireless LAN access point 2 receives the connection request (step S201). The connection request transmission unit 202 of the public wireless LAN access point 2 transmits the connection request to the application management device 3, and the connection request reception unit 31 of the application management device 3 receives the connection request (step S202). Further, the installation control unit 32 of the application management device 3 transmits the installation information to the public wireless LAN access point 2, and the installation information reception unit 203 of the public wireless LAN access point 2 receives the installation information (step S203). In step S203, at the same time when the installation control unit 32 transmits the installation information, or after the transmission, the mobile terminal information transmission unit 33 of the application management device 3 transmits the connection request to the public network 5 to the public wireless LAN connection control device 4, and the mobile terminal information reception unit 41 of the public wireless LAN connection control device 4 receives the connection request to the public network 5 (step S204).

While modes for carrying out the present invention have been described in detail above, a program for causing the mobile terminal 1, the public wireless LAN access point 2, the application management device 3, or the public wireless LAN connection control device 4 to execute the public network connection control method described above may be included in the present invention.

Note that the embodiments described above can be carried out in combination without departing from the scope of the configuration and operation thereof.

APPENDIXES OF THE INVENTION

Appendixes of the outline of the invention extracted from the embodiments described above will be described below. Note that components and processing functions described in the following appendixes can be arbitrarily combined by selecting or omitting the components and processing functions.

Appendix 1

A public network connection control method including the steps of:
receiving a connection request to a public network from a mobile terminal;
installing an application in the mobile terminal, or transmitting installation information, if the connection request to the public network is received; and
transmitting the connection request to the public network to a public wireless LAN connection control device if the connection request to the public network is received.

Appendix 2

The public network connection control method according to appendix 1, wherein if a signal indicating that the mobile terminal has installed the application is received, or if a signal indicating that the mobile terminal has received the installation information is received, the connection request to the public network is transmitted to the public wireless LAN connection control device.

Appendix 3

The public network connection control method according to appendix 1, wherein the installation of the application, or the transmission of the installation information to the mobile terminal is performed via a public wireless LAN access point, and upon receiving a signal indicating the installation of the application or the transmission of the installation information to the mobile terminal, the public wireless LAN access point transmits the connection request to the public network to the public wireless LAN connection control device.

Appendix 4

The public network connection control method according to any one of appendixes 1 to 3, wherein if a signal indicating that the mobile terminal has started to use the application is received, the connection request to the public network is transmitted to the public wireless LAN connection control device.

Appendix 5

The public network connection control method according to any one of appendixes 1 to 4, wherein if a signal indicating that the mobile terminal has logged in to the application is received, the connection request to the public network is transmitted to the public wireless LAN connection control device.

Appendix 6

The public network connection control method according to any one of appendixes 1 to 5, wherein if a signal indicating that the mobile terminal has logged in to the application is not received, a connection upper limit time is set to the public wireless LAN connection control device and then the connection request to the public network is transmitted.

Appendix 7

The public network connection control method according to any one of appendixes 1 to 5, wherein a connection upper limit time is set according to at least one of an operating time and a use content of the application in the mobile terminal and then the connection request to the public network is transmitted.

Appendix 8

The public network connection control method according to appendix 7, wherein the connection upper limit time is set to be longer as the operating time of the application in the mobile terminal increases.

Appendix 9

The public network connection control method according to appendix 7 or 8, wherein
the use content includes the number of reservations of a facility, or a frequency of reservations of the facility, the reservations of the facility being made using the application, and
the connection upper limit time is set to be longer as the number of reservations or the frequency of reservations increases.

Appendix 10

The public network connection control method according to any one of appendixes 1 to 5, wherein the use content includes at least one of a type of a reserved facility and a reserved use period of the reserved facility, the facility being reserved using the application in the mobile terminal, and the connection upper limit time is set to be longer as the reserved use period or a use period estimated according to the type of the facility increases.

Appendix 11

A public network connection control method including the steps of:
receiving a connection request to a public network from a mobile terminal;
installing an application in the mobile terminal, or transmitting installation information, if the connection request to the public network is received; and
establishing a connection to the public network.

Appendix 12

The public network connection control method according to appendix 11, wherein if a signal indicating that the mobile terminal has installed the application is received, or if a signal indicating that the mobile terminal has received the installation information is received, the connection to the public network is established.

Appendix 13

The public network connection control method according to appendix 11, wherein
the installation of the application or the transmission of the installation information to the mobile terminal is performed via a public wireless LAN access point, and
if a signal indicating that the public wireless LAN access point performs the installation of the application or the transmission of the installation information to the mobile terminal is received, the connection to the public network is established.

Appendix 14

The public network connection control method according to any one of appendixes 11 to 13, wherein if a signal indicating that the mobile terminal has started to use the application is received, the connection to the public network is established.

Appendix 15

The public network connection control method according to any one of appendixes 11 to 14, wherein if a signal indicating that the mobile terminal has logged in to the application is received, the connection to the public network is established.

Appendix 16

The public network connection control method according to any one of appendixes 11 to 15, wherein if a signal indicating that the mobile terminal has logged in to the application is not received, a connection upper limit time is set and then the connection to the public network is established.

Appendix 17

The public network connection control method according to any one of appendixes 11 to 15, wherein a connection upper limit time is set according to at least one of an operating time and a use content of the application in the mobile terminal and then the connection to the public network is established.

Appendix 18

The public network connection control method according to appendix 17, wherein the connection upper limit time is set to be longer as the operating time of the application in the mobile terminal increases.

Appendix 19

The public network connection control method according to appendix 17 or 18, wherein
the use content includes the number of reservations of a facility, or a frequency of reservations of the facility, the reservations of the facility being made using the application, and
the connection upper limit time is set to be longer as the number of reservations or the frequency of reservations increases.

Appendix 20

The public network connection control method according to any one of appendixes 17 to 19, wherein
the use content includes at least one of a type of a reserved facility and a reserved use period of the reserved facility, the facility being reserved using the application in the mobile terminal, and
the connection upper limit time is set to be longer as the reserved use period or a use period estimated according to the type of the facility increases.

Appendix 21

An application management device including:
a connection request reception unit that receives a connection request to a public network from a mobile terminal;
an installation control unit that installs an application in the mobile terminal, or transmits installation information, if the connection request reception unit receives the connection request to the public network; and
a connection request transmission unit that transmits the connection request to the public network to a public wireless LAN connection control device if the connection request reception unit receives the connection request to the public network.

Appendix 22

An application management device including:
a connection request reception unit that receives a connection request to a public network from a mobile terminal;
an installation control unit that installs an application in the mobile terminal, or transmits installation information, if the connection request reception unit receives the connection request to the public network; and
a connection establishment unit that establishes a connection to the public network.

The invention claimed is:
1. A public network connection control method, performed by an application management device, the method comprising:

receiving a connection request to a public network from a mobile terminal;

based on the received connection request to the public network, transmitting, to the mobile terminal, an instruction for installing an application in the mobile terminal or transmitting installation information of the application; and transmitting the connection request to the public network to a public wireless LAN connection control device, wherein if a signal indicating that the mobile terminal has logged into the application is received, the connection request to the public network is transmitted to the public wireless LAN connection control device, wherein the application is an application other than applications that enable communication with the public network, and wherein the transmitting the connection request to the public network further comprises, based on receiving a signal indicating that the mobile terminal has received the installation information of the application prior to installing the application, transmitting, to the public wireless LAN connection control device, the connection request to the public network.

2. The public network connection control method according to claim 1, wherein if a signal indicating that the mobile terminal has installed the application is received, the connection request to the public network is transmitted to the public wireless LAN connection control device.

3. The public network connection control method according to claim 1, wherein the installation of the application or the transmission of the installation information to the mobile terminal is performed via a public wireless LAN access point, and if a signal indicating that the public wireless LAN access point has installed the application or has transmitted the installation information to the mobile terminal is received, the connection request to the public network is transmitted to the public wireless LAN connection control device.

4. The public network connection control method according to claim 1, wherein if a signal indicating that the mobile terminal has started to use the application is received, the connection request to the public network is transmitted to the public wireless LAN connection control device.

5. The public network connection control method according to claim 1, wherein if a signal indicating that the mobile terminal has logged in to the application is not received, a connection upper limit time is set to the public wireless LAN connection control device and then the connection request to the public network is transmitted.

6. The public network connection control method according to claim 1, wherein a connection upper limit time is set according to at least one of an operating time and a use content of the application in the mobile terminal and then the connection request to the public network is transmitted.

7. The public network connection control method according to claim 6, wherein the connection upper limit time is set to be longer as the operating time of the application in the mobile terminal increases.

8. The public network connection control method according to claim 6, wherein the use content includes the number of reservations of a facility, or a frequency of reservations of the facility, the reservations of the facility being made using the application, and the connection upper limit time is set to be longer as the number of reservations or the frequency of reservations increases.

9. The public network connection control method according to claim 1, wherein the use content includes at least one of a type of a reserved facility and a reserved use period of the reserved facility, the facility being reserved using the application in the mobile terminal, and the connection upper limit time is set to be longer as the reserved use period or a use period estimated according to the type of the facility increases.

10. A public network connection control method, performed by an application management device, the method comprising:

receiving a connection request to a public network from a mobile terminal;

based on the received connection request to the public network, transmitting, to the mobile terminal, an instruction for installing an application in the mobile terminal or transmitting installation information of the application; and receiving, from the mobile terminal, a signal indicating that the application is installed in the mobile terminal or a signal indicating that installation information of the application is received by the mobile terminal, wherein if a signal indicating that the mobile terminal has logged into the application is received, establishing the connection to the public network, wherein the application is an application other than applications that enable communication with the public network, and wherein the establishing the connection to the public network further comprises, based on receiving a signal indicating that the installation information of the application is received by the mobile terminal prior to installing the application, establishing the connection to the public network.

11. The public network connection control method according to claim 10, wherein if a signal indicating that the application is installed in the mobile terminal is received, the connection to the public network is established.

12. The public network connection control method according to claim 10, wherein the installation of the application or the transmission of the installation information to the mobile terminal is performed via a public wireless LAN access point, and if a signal indicating that the public wireless LAN access point has performed the installation of the application or the transmission of the installation information to the mobile terminal is received, the connection to the public network is established.

13. The public network connection control method according to claim 10, wherein if a signal indicating that the mobile terminal has started to use the application is received, the connection to the public network is established.

14. The public network connection control method according to claim 10, wherein if a signal indicating that the mobile terminal has logged in to the application is not received, a connection upper limit time is set and then the connection to the public network is established.

15. The public network connection control method according to claim 10, wherein a connection upper limit time is set according to at least one of an operating time and a use content of the application in the mobile terminal and then the connection to the public network is established.

16. The public network connection control method according to claim 15, wherein the connection upper limit time is set to be longer as the operating time of the application in the mobile terminal increases.

17. The public network connection control method according to claim 15, wherein
the use content includes the number of reservations of a facility, or a frequency of reservations of the facility, the reservations of the facility being made using the application, and
the connection upper limit time is set to be longer as the number of reservations or the frequency of reservations increases.

18. The public network connection control method according to claim 15, wherein
the use content includes at least one of a type of a reserved facility and a reserved use period of the reserved facility, the facility being reserved using the application in the mobile terminal, and
the connection upper limit time is set to be longer as the reserved use period or a use period estimated according to the type of the facility increases.

19. An application management device comprising:
connection request reception circuitry configured to receive a connection request to a public network from a mobile terminal;
installation control circuitry configured to, based on the received connection request to the public network, transmit, to the mobile terminal, an instruction to install an application in the mobile terminal or transmit installation information; and
connection request transmission circuitry configured to transmit the connection request to the public network to a public wireless LAN connection control device if the connection request reception circuitry receives the connection request to the public network,
wherein if a signal indicating that the mobile terminal has logged into the application is received, the connection request to the public network is transmitted to the public wireless LAN connection control device,
wherein the application is an application other than applications that enable communication with the public network, and
wherein the connection request transmission circuitry is further configured to, based on receiving a signal indicating that the mobile terminal has received the installation information of the application prior to installing the application, transmit, to the public wireless LAN connection control device, the connection request to the public network.

20. An application management device comprising:
connection request reception circuitry configured to receive a connection request to a public network from a mobile terminal; and
installation control circuitry configured to:
based on the received connection request to the public network, transmit to the mobile terminal, an instruction to install an application in the mobile terminal or transmit installation information of the application; and
receive, from the mobile terminal, a signal indicating that the application is installed in the mobile terminal device or a signal indicating that installation information of the application is received by the mobile terminal,
wherein if a signal indicating that the mobile terminal has logged into the application is received, establish the connection to the public network,
wherein the application is an application other than applications that enable communication with the public network, and
wherein the installation control circuitry is further configured to, based on receiving a signal indicating that the installation information of the application is received by the mobile terminal prior to installing the application, establish the connection to the public network.

* * * * *